United States Patent
Suzuki et al.

(10) Patent No.: US 7,152,931 B2
(45) Date of Patent: Dec. 26, 2006

(54) HYDRAULIC CIRCUIT WITH ACCUMULATOR

(75) Inventors: Kenichi Suzuki, Aichi-ken (JP); Kyosuke Hata, Kariya (JP); Yoshihiko Tada, Aichi-ken (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/615,833

(22) Filed: Jul. 10, 2003

(65) Prior Publication Data

US 2004/0017105 A1    Jan. 29, 2004

(30) Foreign Application Priority Data

Jul. 15, 2002   (JP)   ............... 2002-205151

(51) Int. Cl.
*B60T 17/04* (2006.01)
*F16L 55/04* (2006.01)

(52) U.S. Cl. ............... 303/87; 303/10; 138/30

(58) Field of Classification Search ............... 303/87, 303/10, 11, 85; 138/30, 31, 30 X
See application file for complete search history.

(56) References Cited

U.S. PATENT DOCUMENTS

| | | | |
|---|---|---|---|
| 4,526,205 A | 7/1985 | Sugimura et al. | |
| 4,807,945 A | 2/1989 | Budecker et al. | |
| 5,638,868 A * | 6/1997 | Loran | 138/31 |
| 6,527,012 B1 * | 3/2003 | Weber | 138/31 |
| 6,622,755 B1 * | 9/2003 | Weber | 138/30 |
| 6,666,529 B1 * | 12/2003 | Mohr | 303/87 |
| 2002/0035832 A1 | 3/2002 | Nakamura et al. | |

FOREIGN PATENT DOCUMENTS

| | | |
|---|---|---|
| DE | 37 07 803 A1 | 9/1988 |
| DE | 3901261 A1 * | 7/1990 |
| EP | 0 495 483 A2 | 7/1992 |
| GB | 1127731 | 9/1968 |
| JP | 54-127023 | 10/1979 |
| JP | 2576998 | 11/1996 |
| JP | 2002-225702 | 8/2002 |
| WO | WO 00/79135 A1 | 12/2000 |
| WO | WO0073663 A1 * | 12/2000 |
| WO | WO0134984 A2 * | 5/2001 |

* cited by examiner

*Primary Examiner*—Xuan Lan Nguyen
(74) *Attorney, Agent, or Firm*—Buchanan Ingersoll & Rooney PC

(57) ABSTRACT

A hydraulic circuit includes an accumulator having an inflow passage which introduces a hydraulic fluid which is discharged from a hydraulic pump into a hydraulic fluid chamber and a discharge passage which discharges the hydraulic fluid from the hydraulic fluid chamber to a hydraulic actuator. The hydraulic circuit includes a valve mechanism which restricts the supply of hydraulic fluid from the hydraulic fluid chamber to the hydraulic actuator when the pressure in the hydraulic fluid chamber is less than a set pressure and which releases the restriction of the supply of hydraulic fluid to the hydraulic actuator when the pressure in the hydraulic fluid chamber is at least the set pressure. The valve mechanism may be installed inside the accumulator.

4 Claims, 11 Drawing Sheets

HYDRAULIC CIRCUIT WITH ACCUMULATOR

BACKGROUND OF THE INVENTION

1. Field of the Invention

The present invention relates to a hydraulic circuit, and in particular to a hydraulic circuit including an accumulator having an inflow passage which introduces a hydraulic fluid which is discharged from a hydraulic pump into a hydraulic fluid chamber and a discharge passage which discharges the hydraulic fluid from the hydraulic fluid chamber to a hydraulic actuator.

2. Description of the Related Art

An example of this type of hydraulic circuit is disclosed in, for example, Japanese Patent No. 2576998. In the disclosed hydraulic circuit, a hydraulic fluid which is discharged from a hydraulic pump is introduced into a hydraulic fluid chamber of an accumulator through an inflow passage, and then the hydraulic fluid is discharged from the hydraulic fluid chamber of the accumulator to a hydraulic actuator such as a hydraulic booster through a discharge passage. As a result, pulsations of the hydraulic fluid discharged from the hydraulic pump are securely decreased by the operation of the accumulator.

In the case where an accumulator which operates when the pressure in a hydraulic fluid chamber is at least a set pressure is used to decrease pulsations of the hydraulic fluid discharged from a hydraulic pump, in a transient period until the pressure in the hydraulic fluid chamber reaches the set pressure, the accumulator does not operate, and pulsations of the hydraulic fluid which is discharged from the hydraulic pump cannot be decreased.

SUMMARY OF THE INVENTION

The present invention was made in order to solve the above-described problem, and an object of the present invention is to provide a hydraulic circuit which employs an accumulator that operates when the pressure in a hydraulic fluid chamber is at least a set pressure and which can reduce pulsations of hydraulic fluid discharged from a hydraulic pump in a transient period until the pressure in the hydraulic fluid chamber reaches the set pressure.

The present invention provides a hydraulic circuit including an accumulator having an inflow passage which introduces a hydraulic fluid which is discharged from a hydraulic pump into a hydraulic fluid chamber and a discharge passage which discharges the hydraulic fluid from the hydraulic fluid chamber to a hydraulic actuator. The hydraulic circuit includes a valve mechanism which restricts the supply of hydraulic fluid from the hydraulic fluid chamber to the hydraulic actuator when the pressure in the hydraulic fluid chamber is less than the set pressure and which releases the restriction on the supply of hydraulic fluid to the hydraulic actuator when the pressure in the hydraulic fluid chamber is at least the set pressure. The valve mechanism may be installed inside the accumulator.

In a hydraulic circuit according to the present invention, a valve mechanism is provided which restricts the supply of hydraulic fluid to a hydraulic actuator when the pressure in a hydraulic fluid chamber is less than a set pressure and which releases the restriction on the supply of hydraulic fluid to the hydraulic actuator when the pressure in the hydraulic fluid chamber is at least the set pressure. Therefore, in a transient period until the pressure in the hydraulic fluid chamber reaches the set pressure, the supply of hydraulic fluid from the hydraulic fluid chamber of the accumulator to the hydraulic actuator is restricted by the valve mechanism. Accordingly, the transmission of pulsations of the hydraulic fluid from the hydraulic fluid chamber of the accumulator to the hydraulic actuator are restricted, and the discomfort caused by pulsations of the hydraulic fluid in the hydraulic actuator can be decreased.

In addition, when the pressure in the hydraulic fluid chamber becomes at least the set pressure, the accumulator operates, and pulsations of the hydraulic fluid which is discharged from the hydraulic pump are decreased, so the discomfort caused by pulsations of the hydraulic fluid in the hydraulic actuator can be decreased. Moreover, at this time, the valve mechanism releases the restriction on the supply of hydraulic fluid from the accumulator to the hydraulic actuator, so a necessary and sufficient amount of hydraulic fluid can be supplied from the accumulator to the hydraulic actuator.

According to one form of the invention, the valve mechanism is installed inside the accumulator, so the structure of the hydraulic circuit can be made more compact compared to the case in which the valve mechanism is installed outside the accumulator.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF PREFERRED EMBODIMENTS

Figure 1:
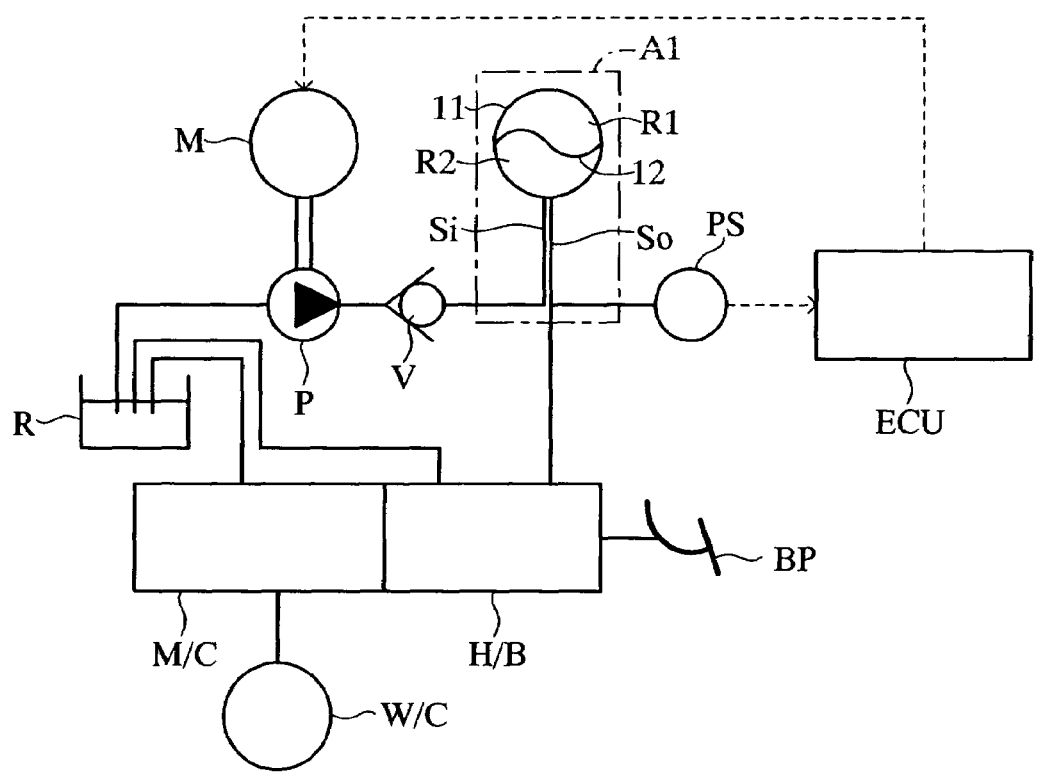
FIG. 1 is a block diagram schematically showing a hydraulic circuit according to a first embodiment of the present invention.
Figure 2:
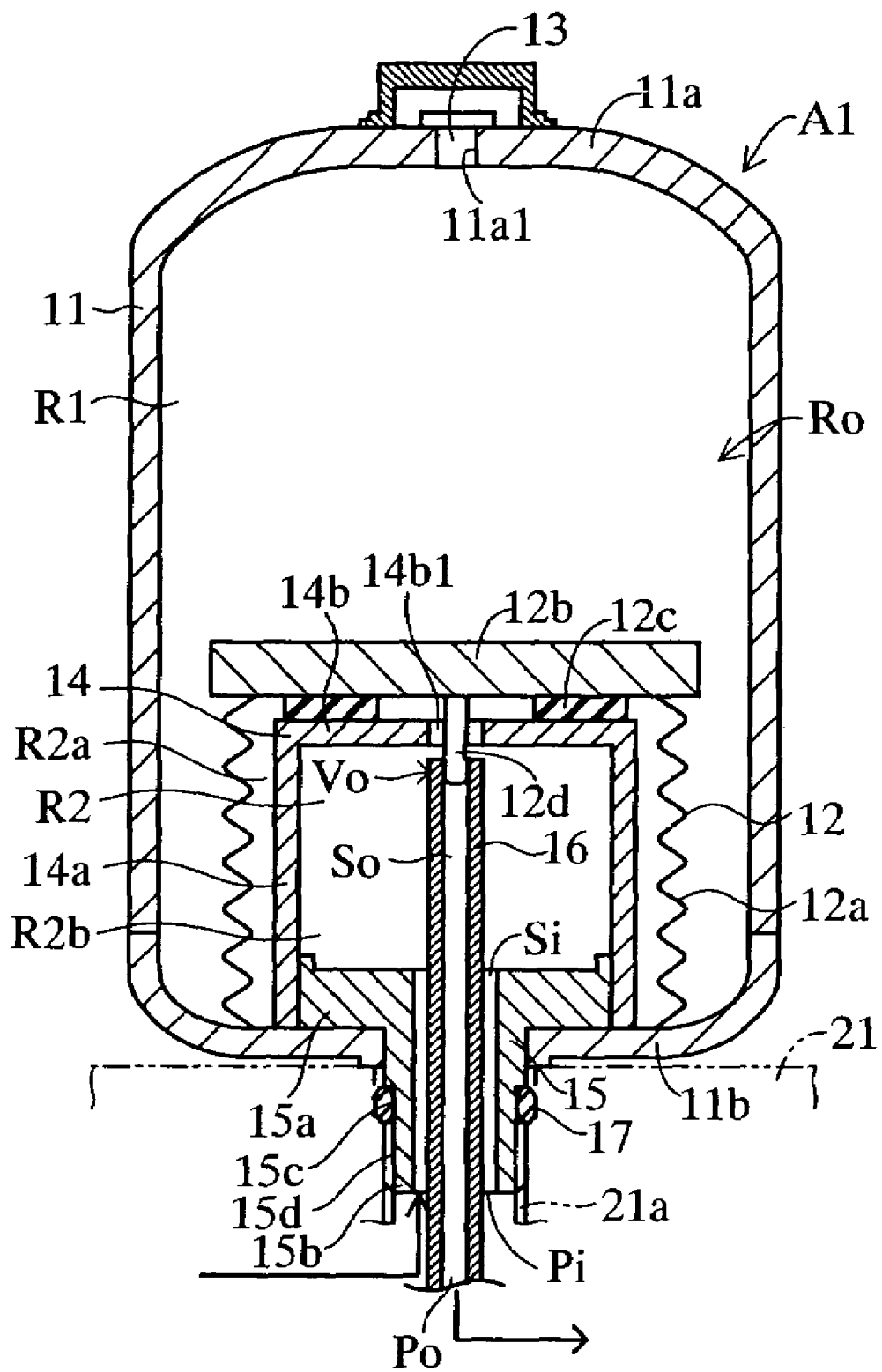
FIG. 2 is an enlarged cross-sectional elevation of the accumulator of the embodiment of FIG. 1 when a hydraulic fluid is not stored in the hydraulic fluid chamber of the accumulator.
Figure 3:
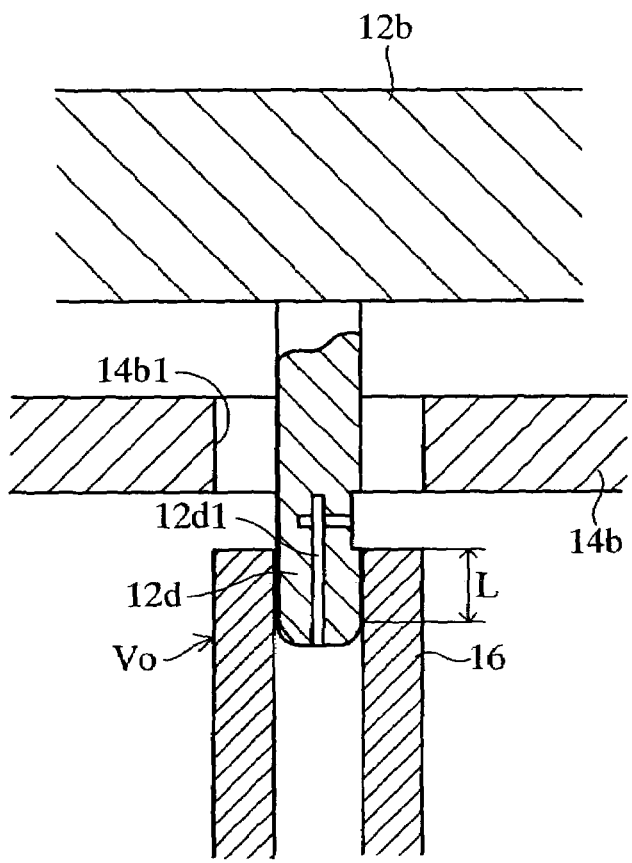
FIG. 3 is an enlarged cross-sectional elevation of the valve mechanism of the accumulator of FIG. 2.

Embodiments of the present invention will be described while referring to the accompanying drawings. FIGS. 1–3 schematically illustrate a first embodiment of the present invention employed as brake hydraulic circuit for an automobile. In this embodiment, a hydraulic fluid from a hydraulic pump P which is driven by an electric motor M passes through a check valve V and is stored in an accumulator A1. From the accumulator A1, the hydraulic fluid is supplied to a hydraulic booster H/B as a hydraulic actuator, which operates in response to the pressing of a brake pedal BP to provide a supplemental force for operation of a master cylinder M/C. The hydraulic fluid which is not needed by the hydraulic booster H/B is returned to a reservoir R.

In this first embodiment, the hydraulic pump P is connected to the reservoir R, and the master cylinder M/C is connected to the reservoir R and to a plurality of wheel cylinders W/C for the brakes of the automobile. The operation of the electric motor M is controlled by an electronic control unit ECU in response to a signal from a pressure sensor PS which senses the pressure of hydraulic fluid stored in the accumulator A1 when an unillustrated ignition switch is in an ON state. Specifically, operation of the motor M is stopped at or above a prescribed PUMP OFF pressure, and the operation is restarted at or below a PUMP ON pressure lower than the PUMP OFF pressure.

As shown in FIG. 2, the accumulator A1 is a metal bellows-type hydraulic accumulator which operates by expansion and contraction of a bellows 12. The accumulator A1 operates when the pressure of hydraulic fluid supplied to the interior of a hydraulic fluid chamber R2 is at least a set pressure, which is lower than the PUMP ON pressure and slightly higher than the gas pressure within a gas chamber R1 in the state shown in FIG. 2. The accumulator A1 includes a shell 11 which forms a pressure space Ro and a bellows 12 which is disposed inside the pressure space Ro. The shell 11 comprises an upper portion and a lower portion which are joined to each other in a gas-tight manner. A plug 13 which seals a gas charging port 11a1 in a gas-tight manner is installed in an upper wall 11a of the shell 11.

The bellows 12 has a cylindrical metal accordion-shaped bellows wall 12a and a metal movable plate 12b which is joined to the upper end of the bellows wall 12a in a gas-tight and liquid-tight manner. The lower end of the bellows wall 12a is secured to a lower wall 11b of the shell 11 in a gas-tight and liquid-tight manner. The bellows 12 divides the pressure space Ro into the gas chamber R1 on the exterior of the bellows 12 which is filled with a prescribed pressurized gas, and the hydraulic fluid chamber R2 on the inside of the bellows 12 which communicates with a fluid inlet Pi and a fluid outlet Po. A stay 14, a cylindrical member 15, and a pipe 16 are installed inside the bellows 12, i.e., inside the hydraulic fluid chamber R2.

The stay 14 divides the hydraulic fluid chamber R2 inside the bellows 12 into an outer hydraulic fluid chamber R2a and an inner hydraulic fluid chamber R2b. In addition, the stay 14 limits the amount by which the bellows 12 can contract. The stay 14 has a cylindrical wall 14a having a lower end which is secured in a liquid-tight manner to the lower wall 11b of the shell 11, and an upper wall 14b which is integrally formed with the upper end of the cylindrical wall 14a. A connecting hole 14b1 which communicates between the outer hydraulic fluid chamber R2a and the inner hydraulic fluid chamber R2b is formed in the upper wall 14b of the stay 14.

The cylindrical member 15 includes an annular flange 15a which is secured in a liquid-tight manner to the lower wall 11b of the shell 11 and to the cylindrical wall 14a of the stay 14. The cylindrical member 15 also includes a lower cylindrical portion 15b which extends downwards from the flange 15a through the lower wall 11b of the shell 11. An inflow passage Si is formed in the center of the cylindrical member 15. The lower end of the inflow passage Si communicates with the fluid inlet Pi, and the upper end of the inflow passage Si opens onto the lower portion of the inner hydraulic fluid chamber R2b.

An O-ring installation groove 15c and a male thread 15d are formed on the lower cylindrical portion 15b of the cylindrical member 15. After an O-ring 17 is installed in the O-ring installation groove 15c, the male thread 15d is screwed into a female thread 21a of a pump body 21, which functions as a support member for the accumulator A1. Thus, the accumulator A1 is removably installed in the pump body 21.

The pipe 16 is coaxially disposed in the inflow passage Si of the cylindrical member 15 and passes through the cylindrical member 15. The lower end of the pipe 16 is connected and fixed to an unillustrated portion of the pump body 21 forming a discharge passage. A discharge passage So is formed at the center of the pipe 16. The lower end of the discharge passage So communicates with the fluid outlet Po, and its upper end opens into the upper portion of the inner hydraulic fluid chamber R2b.

In this first embodiment, an annular seal member 12c and a valve spool 12d are provided on the lower surface of the movable plate 12b of the bellows 12. The annular seal member 12c can seat and unseat with respect to the upper wall 14b of the stay 14 to thereby prevent and allow fluid communication between the inner hydraulic fluid chamber R2b and the outer hydraulic fluid chamber R2a through the connecting hole 14b1 in the upper wall 14b of the stay 14.

As shown in FIGS. 2 and 3, the valve spool 12d is positioned so as to be able to fit into and disengage from the upper end of the pipe 16. Together with the upper end of the pipe 16, it forms a valve mechanism Vo. When the movable plate 12b is in the position shown in FIG. 2, the valve spool 12d fits into and overlaps the upper end of the pipe 16 by a prescribed amount L in the axial direction of the pipe 16 and thereby restricts the supply of hydraulic fluid to the hydraulic booster H/B to a minute amount. When the movable plate 12b moves upwards from the position shown in FIG. 2 by at least the prescribed amount L (namely, when the pressure in the hydraulic fluid chamber R2 is at least a set pressure), the valve spool 12d is pulled out of the upper end of the pipe 16, and restriction of the supply of hydraulic fluid to the hydraulic booster H/B is released.

As shown in FIG. 3, a small air discharge hole 12d1 for discharging air from the hydraulic fluid chamber R2 in a previous step when the hydraulic fluid chamber R2 is being filled with the hydraulic fluid is formed in the valve spool 12d. Instead of the air discharge hole 12d1, it is possible to form a small air discharge groove for discharging air from inside the hydraulic fluid chamber R2 on the outer periphery of the portion of the valve spool 12d which fits inside the upper end of the pipe 16 or to form a small air discharge groove for discharging air from the inside of the hydraulic fluid chamber R2 on the inner periphery of the upper end of the pipe 16.

Figure 4:
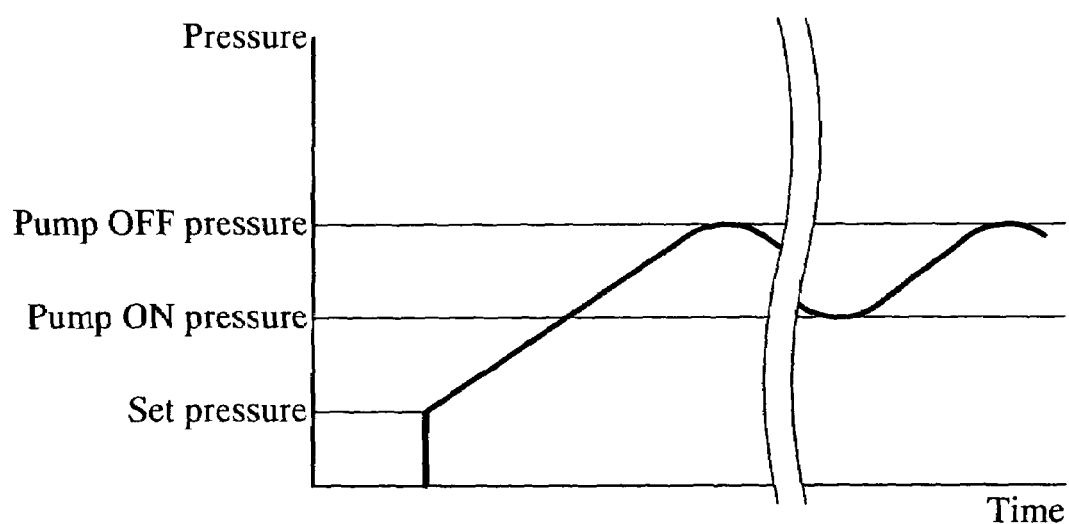
FIG. 4 is a graph of the pressure in the hydraulic fluid chamber of the accumulator of FIG. 2 as a function of time when a hydraulic fluid is stored in the hydraulic fluid chamber.

In the hydraulic circuit of the first embodiment having the above-described structure, when an unillustrated ignition switch is turned ON in the state in which the hydraulic fluid is not stored in the hydraulic fluid chamber R2 of the accumulator A1 (the state shown in FIG. 2), the hydraulic pump P is driven by the electric motor M, the hydraulic fluid from the reservoir R passes through the check valve V and is stored in the hydraulic fluid chamber R2 of the accumulator A1, and the pressure in the hydraulic fluid chamber R2 rises as shown in FIG. 4 towards the PUMP OFF pressure.

At this time, as the hydraulic fluid accumulates in the hydraulic fluid chamber R2 of the accumulator A1, the movable plate 12b moves upwards, and the bellows wall 12a of the bellows 12 elongates. When the pressure in the hydraulic fluid chamber R2 reaches the PUMP OFF pressure, driving of the hydraulic pump P by the electric motor M is stopped. When the pressure in the hydraulic fluid chamber R2 falls to the PUMP ON pressure due to supply of the hydraulic fluid to the hydraulic booster H/B or leakage of the hydraulic fluid through the check valve V and the like, the hydraulic pump P is again driven by the electric motor M, and the hydraulic fluid passes through the check valve V and again accumulates in the hydraulic fluid chamber R2 in the accumulator A1.

In this first embodiment, the valve mechanism Vo comprising the valve spool 12d provided on the movable plate 12b and the upper end of the pipe 16 is provided inside the accumulator A1, so in a transient period until the pressure within the hydraulic fluid chamber R2 reaches the set pressure, the supply of hydraulic fluid from the hydraulic fluid chamber R2 of the accumulator A1 to the hydraulic booster H/B is restricted by the valve mechanism Vo. Accordingly, the transmission of pulsations of the hydraulic fluid from the hydraulic fluid chamber R2 of the accumulator A1 to the hydraulic booster H/B is also restricted, and the discomfort caused by pulsations of the hydraulic fluid in the hydraulic booster H/B can be decreased.

When the pressure in the hydraulic fluid chamber R2 becomes at least the set pressure, the bellows wall 12a of the bellows 12 in the accumulator A1 expands and contracts, to thereby decrease pulsations of the hydraulic fluid discharged from the hydraulic pump P, so the discomfort caused by pulsations of the hydraulic fluid in the hydraulic booster H/B can be decreased. Moreover, at this time, the valve spool 12d of the valve mechanism Vo is pulled out of the upper end of the pipe 16, and the restriction of the supply of hydraulic fluid from the accumulator A1 to the hydraulic booster H/B is released, so a necessary and sufficient amount of hydraulic fluid can be supplied from the accumulator A1 to the hydraulic booster H/B.

Figure 5:
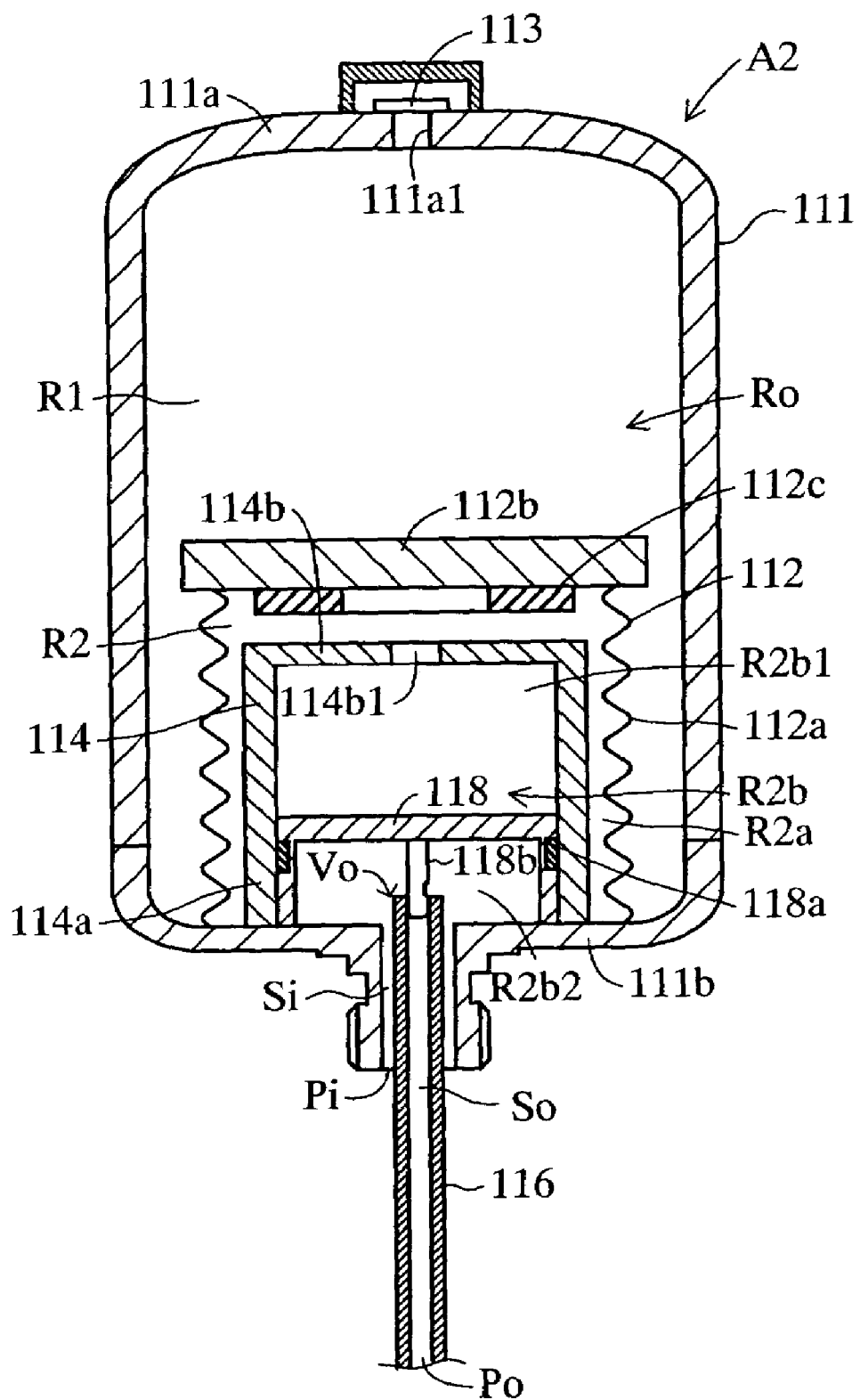
FIG. 5 is a cross-sectional elevation of an accumulator according to a second embodiment of the present invention.
Figure 6:
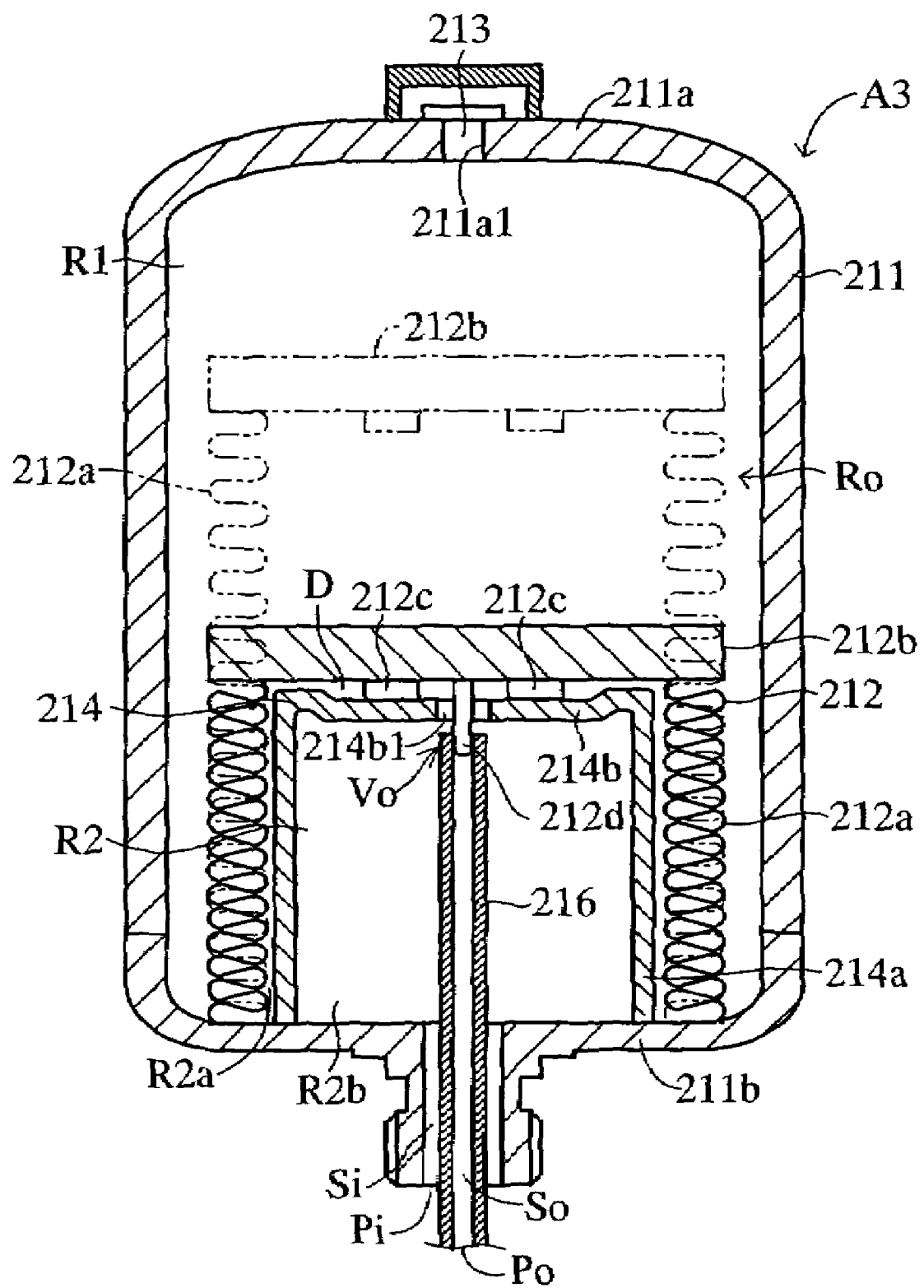
FIG. 6 is a cross-sectional elevation of an accumulator according to a third embodiment of the present invention.

The hydraulic circuit according to the present invention is not restricted to one using an accumulator A1 having a structure shown in FIG. 2. FIGS. 5 and 6 illustrate accumulators A2 and A3 according to second and third embodiments, respectively, of the present invention. Each of accumulators A2 and A3 is equipped with a valve spool 118b or 212d which can perform the same function as the valve spool 12d of the first embodiment, and the same operational effects can be obtained.

The accumulator A2 of the second embodiment shown in FIG. 5 includes a shell 111 which forms a pressure space Ro and a bellows 112 disposed inside the pressure space Ro. The shell 111 comprises upper and lower portions which are connected to each other in a gas-tight manner. A plug 113 which seals a gas charging opening 111a1 in a gas-tight manner is installed on an upper wall 111a of the shell 111.

The bellows 112 has a cylindrical metal accordion-shaped bellows wall 112a and a metal movable plate 112b which is connected in a gas-tight and liquid-tight manner to the upper end of the bellows wall 112a. The lower end of the bellows wall 112a is secured in a gas-tight and liquid-tight manner to a lower wall 111b of the shell 111. The bellows 112 divides the pressure space Ro into a gas chamber R1 on the outside of the bellows 112 filled with a prescribed pressurized gas and a hydraulic fluid chamber R2 on the inside of the bellows 112. An auxiliary shell 114 and a piston 118 are disposed inside the bellows 112, i.e., inside the hydraulic fluid chamber R2.

The auxiliary shell 114 divides the hydraulic fluid chamber R2 inside the bellows 112 into an outer hydraulic fluid chamber R2a and an inner hydraulic fluid chamber R2b. In addition, the auxiliary shell 114 restricts the contraction of the bellows 112. The auxiliary shell 114 has a cylindrical wall 114a having a lower end which is secured in a liquid-tight manner to the lower wall 111b of the shell 111, and an upper wall 114b which is integrally formed with the upper end of the cylindrical wall 114a. A connecting hole 114b1 which communicates between the outer hydraulic fluid chamber R2a and the inner hydraulic fluid chamber R2b is formed in the upper wall 114b of the auxiliary shell 114.

The piston 118 is a movable wall member which divides the interior of the auxiliary shell 114 (the inner hydraulic fluid chamber R2b) into a lower chamber R2b2 which communicates with a fluid inlet Pi through an inflow passage Si formed in the lower end of the shell 111 and an upper chamber R2b1 which communicates with the outer hydraulic fluid chamber R2a through the connecting hole 114b1 in the auxiliary shell 114. The piston 118 has the shape of a cylindrical container having a bottom. A sealing ring 118a is mounted on the outer periphery of the piston 118. The piston 118 is fit inside the cylindrical wall 114a (cylinder bore) of the auxiliary shell 114 so as to form a liquid-tight seal while being able to slide in the axial direction of the auxiliary shell 114. The stroke of the piston 118 is restricted by contact by the piston 118 with the upper wall 114b of the auxiliary shell 114 or with the lower wall 111b of the shell 111.

In this second embodiment, the maximum volume and the minimum volume of the upper chamber R2b1 are selected such that when a hydraulic fluid fills the hydraulic fluid chamber R2a between the bellows 112 and the auxiliary shell 114 and the upper chamber R2b1 between the auxiliary shell 114 and the piston 118 and a fluid amount Q corresponding to the maximum volume minus the minimum volume of the upper chamber R2b1 is transferred from the upper chamber R2b1 into the outer hydraulic fluid chamber R2a, a gap is present between the upper surface of the movable plate 112b of the bellows 112 and the upper wall 111a of the shell 111 to avoid a collision between the two, and such that when the fluid amount Q is transferred from the outer hydraulic fluid chamber R2a into the upper chamber R2b1, a gap is present between the lower surface of the movable plate 112b of the bellows 112 and the opposing upper wall 114b of the auxiliary shell 114 so as to prevent a collision between the two.

In this second embodiment, an annular sealing member 112c is provided on the lower surface of the movable plate 112b in the bellows 112, i.e., on the surface of the movable plate 112b opposing the upper wall 114b of the auxiliary shell 114. The annular sealing member 112c can seat and unseat with respect to the upper wall 114b of the auxiliary shell 114 to thereby prevent and allow fluid communication between the connecting hole 114b1 in the upper wall 114b of the auxiliary shell 114 and the outer hydraulic fluid chamber R2a.

In this second embodiment, a pipe 116 which passes through an inflow passage Si formed in the lower portion of the shell 111 is coaxially disposed with respect to the inflow passage Si. The lower end of the pipe 116 is secured to an unillustrated portion of a pump body defining a discharge passage. A discharge passage So is formed at the center of the pipe 116. The lower end of the discharge passage So communicates with a fluid outlet Po, and the upper end opens into the midportion of the lower chamber R2b2.

In this second embodiment, a valve spool 118b is provided on the lower surface of the piston 118. The valve spool 118b is positioned so as to be able to fit into and disengage from the upper end of the pipe 116. The valve spool 118b forms a valve mechanism Vo together with the upper end of the pipe 116. When the piston 118 is in the position shown in FIG. 5, the valve spool 118b fits into and overlaps the upper end of the pipe 116 in the axial direction of the pipe 116 by a prescribed amount L, and it restricts the supply of hydraulic fluid to the hydraulic booster H/B to a minute amount. When the piston 118 has moved from the position shown in FIG. 5 by at least the prescribed amount L (namely, when the pressure in the lower chamber R2b2 becomes at least a set pressure), the valve spool 118b is pulled out of the upper end of the pipe 116, and the restriction on the supply of hydraulic fluid to the hydraulic booster H/B is released. A small air discharge hole (which may have the same structure as the small air discharge hole 12d1 of FIG. 3) for discharging air from the lower chamber R2b2 during a previous step when filling the lower chamber R2b2 with the hydraulic fluid is formed in the valve spool 118b.

In this second embodiment, the valve mechanism Vo comprising the valve spool 118b provided on the piston 118 and the upper end of the pipe 116 is provided in the accumulator A2, so in a transient period until the pressure in the lower chamber R2b2 reaches the set pressure, the supply of hydraulic fluid from the lower chamber R2b2 of the accumulator A2 to the hydraulic booster H/B is restricted by the valve mechanism Vo. Accordingly, the transmission of pulsations of the hydraulic fluid from the lower chamber R2b2 of the accumulator A2 to the hydraulic booster H/B is also restricted, and the discomfort caused by pulsations of the hydraulic fluid in the hydraulic booster H/B can be decreased.

When the pressure in the lower chamber R2b2 becomes at least the set pressure, the piston 118 of the accumulator A2 moves up and down and the bellows wall 112a of the bellows 112 expands and contracts, to thereby decrease pulsations of the hydraulic fluid discharged from the hydraulic pump P, so the discomfort caused by pulsations of the hydraulic fluid in the hydraulic booster H/B can be decreased. Moreover, at this time, the valve spool 118b of the valve mechanism Vo is pulled out of the upper end of the pipe 116, and the restriction of the supply of hydraulic fluid from the accumulator A2 to the hydraulic booster H/B is released, so a necessary and sufficient amount of hydraulic fluid can be supplied from the accumulator A2 to the hydraulic booster H/B.

The accumulator A3 of the third embodiment shown in FIG. 6 includes a shell 211 which forms a pressure space Ro and a bellows 212 disposed in the pressure space Ro. The shell 211 comprises upper and lower portions connected to each other in a gas-tight manner. A plug 213 which seals a gas charging port 211al in a gas-tight manner is installed in an upper wall 211a of the shell 211.

The bellows 212 comprises a cylindrical metal accordion-shaped bellows wall 212a and a metal movable plate 212b which is connected in a gas-tight and liquid-tight manner to the upper end of the bellows wall 212a. The lower end of the bellows wall 212a is secured in a gas-tight and liquid-tight manner to a lower wall 211b of the shell 211. The bellows 212 divides the pressure space Ro into a gas chamber R1 on the outside of the bellows 212 which is filled with a prescribed pressurized gas and an hydraulic fluid chamber R2 on the inside of the bellows 212.

An auxiliary shell 214 is provided inside the bellows 212, i.e., inside the hydraulic fluid chamber R2. Four rubber plates 212c are secured at equal intervals in a circumferential direction to the lower surface of the movable plate 212b in order to always form a gap D between the auxiliary shell 214 and the movable plate 212b, as well as to cushion impact between the two.

The auxiliary shell 214 also functions as a stopper member which limits the amount of contraction of the bellows 212 whose free state is illustrated by imaginary lines in FIG. 6. The auxiliary shell 214 has a cylindrical wall 214a and an upper wall 214b. The lower end of the cylindrical wall 214b is secured to the lower wall 211b of the shell 211. The auxiliary shell 214 divides the hydraulic fluid chamber R2 into an outer hydraulic fluid chamber R2a and an inner hydraulic fluid chamber R2b.

The outer hydraulic fluid chamber R2a always communicates with the inner hydraulic fluid chamber R2b through a connecting passage comprising the above-described gap D and a connecting hole 214b1 formed in the upper wall 214b of the auxiliary shell 214. Therefore, the pressure of hydraulic fluid which is supplied from the hydraulic pump P of FIG. 1 through the check valve V to the fluid inlet Pi and is supplied to the inner hydraulic fluid chamber R2b through the inflow passage Si acts, through the connecting hole 214b1 and the above-described gap D, on the entire lower surface of the movable plate 212b except for where the rubber plates 212c are provided, and the pressure pushes the movable plate 212b upwards in FIG. 6 and guarantees smooth expansion of the bellows 212.

In this third embodiment, a pipe 216 which passes through the inflow passage Si formed in the lower end of the shell 211 is coaxial with respect to the inflow passage Si. The lower end of the pipe 216 is connected and fixed to an unillustrated portion of a pump body forming a discharge passage. A discharge passage So is formed at the center of the pipe 216. The lower end of the discharge passage So communicates with a fluid outlet Po, and its upper end opens into the upper portion of the inner hydraulic fluid chamber R2b.

In this third embodiment, a valve spool 212d is provided on the lower surface of the movable plate 212b. The valve spool 212d is positioned so as to be able to fit into and disengage from the upper end of the pipe 216. The valve spool 212d forms a valve mechanism Vo together with the upper end of the pipe 216. When the movable plate 212b is in the position shown by solid lines in FIG. 6, the valve spool 212d fits into and overlaps the upper end of the pipe 216 in the axial direction of the pipe 216 by a prescribed distance L to restrict the supply of hydraulic fluid to the hydraulic booster H/B to a minute amount. When the movable plate 212b moves upwards from the position shown by solid lines in FIG. 6 by at least the prescribed amount L (namely, when the pressure in the hydraulic fluid chamber R2 becomes at least a set pressure), the valve spool 212d is pulled out of the upper end of the pipe 216, and the restriction on the supply of hydraulic fluid to the hydraulic booster H/B is released. A small air discharge hole (which may have the same structure as the small air discharge hole 12d1 of FIG. 3) for discharging air from the hydraulic fluid chamber R2 during a previous step when the hydraulic fluid chamber R2 is being filled with the hydraulic fluid is formed in the valve spool 212d.

In this third embodiment, the valve mechanism Vo which comprises the valve spool 212d provided on the movable plate 212b and the upper end of the pipe 216 is provided inside the accumulator A3, so in a transient period until the pressure inside the hydraulic fluid chamber R2 reaches the set pressure, the supply of hydraulic fluid from the hydraulic fluid chamber R2 of the accumulator A3 to the hydraulic booster H/B is restricted by the valve mechanism Vo. Accordingly, the transmission of pulsations of the hydraulic fluid from the hydraulic fluid chamber R2 of the accumulator A3 to the hydraulic booster H/B is also restricted, and the discomfort caused by pulsations of the hydraulic fluid in the hydraulic booster H/B can be decreased.

When the pressure in the hydraulic fluid chamber R2 becomes at least the set pressure, the bellows wall 212a of the bellows 212 in the accumulator A3 expands and contracts, to thereby decrease pulsations of the hydraulic fluid discharged from the hydraulic pump P, so the discomfort caused by pulsations of the hydraulic fluid in the hydraulic booster H/B can be decreased. Moreover, at this time, the valve spool 212d of the valve mechanism Vo is pulled out of the upper end of the pipe 216, and the restriction of the supply of hydraulic fluid from the accumulator A3 to the hydraulic booster H/B is released, so a necessary and sufficient amount of hydraulic fluid can be supplied from the accumulator A3 to the hydraulic booster H/B.

In each of the above-described embodiments, a valve spool 12d, 118b, or 212d which can fit into or disengage from the upper end of a pipe 16, 116, or 216 is used as a valve mechanism Vo which restricts the supply of hydraulic fluid to the hydraulic booster H/B when the pressure in the hydraulic fluid chamber is less than a set pressure and which releases the restriction of the supply of hydraulic fluid to the hydraulic booster H/B when the pressure in the hydraulic fluid chamber is at least the set pressure. However, the hydraulic circuit according to the present invention may employ a valve mechanism Vo according to a fourth embodiment shown in FIGS. 7–9.

Figure 7:
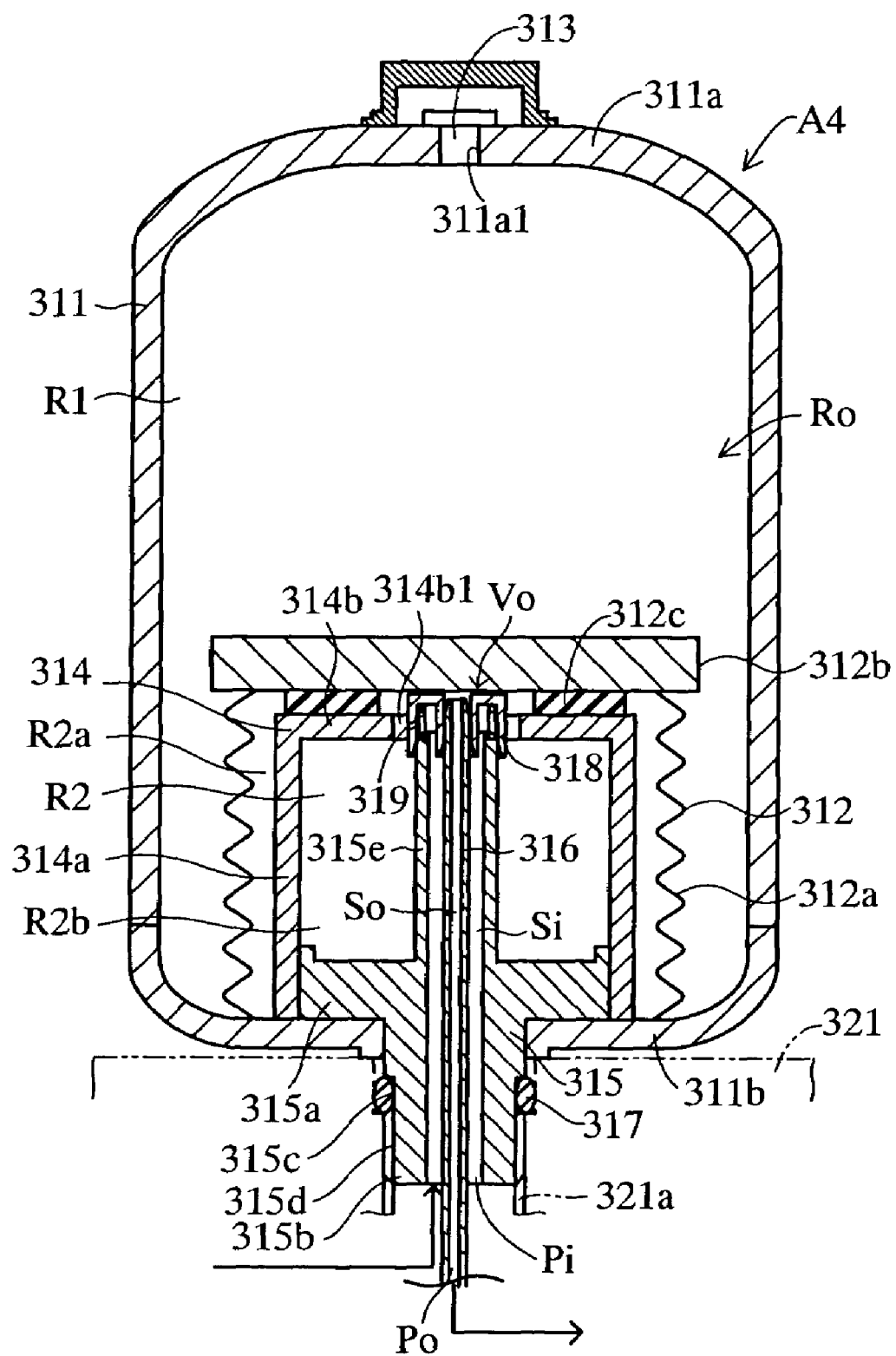
FIG. 7 is a cross-sectional elevation of an accumulator according to a fourth embodiment of the present invention.
Figure 8:
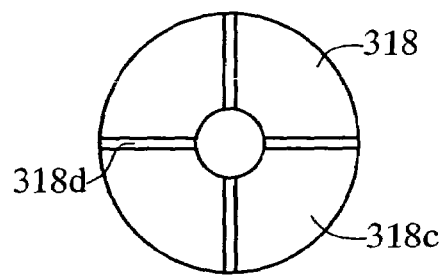
FIG. 8 is a plan view of the cylindrical valve body of the accumulator shown in FIG. 7.

The valve mechanism Vo of the fourth embodiment shown in FIGS. 7–9 comprises an upper cylindrical portion 315e which is integrally formed with a cylindrical member 315 and projects towards the upper end of an inner hydraulic fluid chamber R2b, a cylindrical valve body 318 which fits on the upper end of a pipe 316 so as to be able to move up and down on the pipe 316 and which can interfit with and disengage from the upper end of the upper cylindrical portion 315e, and a spring 319 which is disposed between the cylindrical valve body 318 and the upper cylindrical portion 315e and which biases the cylindrical valve body 318 upwards when the cylindrical valve body 318 is pressed downwards by a movable plate 312b of a bellows 312.

The cylindrical valve body 318 has an outer cylindrical portion 318a, an inner cylindrical portion 318b, and an annular portion 318c which connects the upper ends of the cylindrical portions 318a and 318b. As shown in FIGS. 8 and 9, four narrow, radially-extending air discharge grooves 318d for discharging air from the hydraulic fluid chamber R2 in a previous step when the hydraulic fluid chamber R2 is being filled with the hydraulic fluid are formed in the top surface of the annular portion 318c.

Figure 9A:
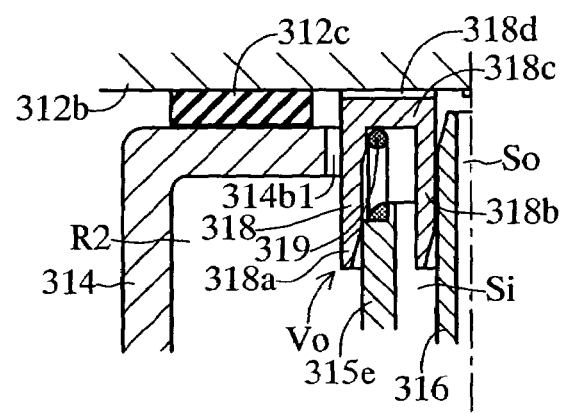
FIGS. 9A and 9B are enlarged cross-sectional elevations of portions of the valve mechanism of the accumulator shown in FIG. 7.

When a movable plate 312b is in the position shown in FIG. 7 and FIG. 9A, the cylindrical valve body 318 is pressed downwards by the movable plate 312b against the spring 319, and the cylindrical value body 318 interfits with and overlaps the upper end of the upper cylindrical portion 315e by a prescribed amount in the axial direction of the upper cylindrical portion 315e and limits fluid communication between an inflow passage Si and a discharge passage So, to thereby restricts the supply of hydraulic fluid to the hydraulic booster H/B.

Figure 9B:
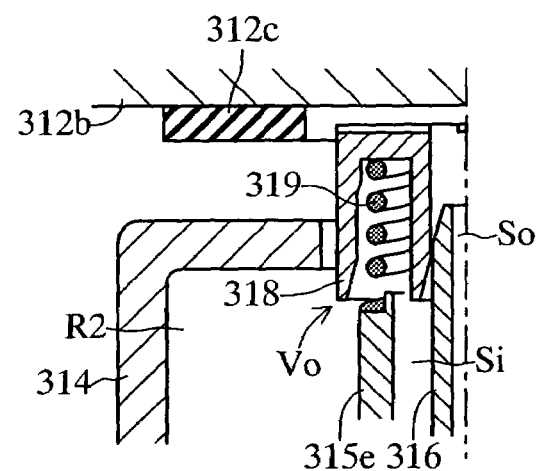

When the movable plate 312b moves upwards from the position shown in FIG. 9A by at least the prescribed amount, as shown in FIG. 9B, the cylindrical valve body 318 is pressed upwards by the spring 319, and it is detached from the upper end of the upper cylindrical portion 315e and also becomes disengaged from the movable plate 312b. As a result, the restriction on the communication between the inflow passage Si and the discharge passage So is released, and the restriction of the supply of hydraulic fluid to the hydraulic booster H/B is released.

Except for the structure of the valve mechanism Vo, the structure of the accumulator A4 of this fourth embodiment shown in FIGS. 7–9 is essentially the same as that of the accumulator A1 of the first embodiment shown in FIG. 2. The structure of components in FIGS. 7–9 having the same structure as components in FIG. 2 either have the same reference numbers or else have reference numbers 300 higher than in FIG. 2, so a detailed explanation of those parts will be omitted.

In this fourth embodiment, the valve mechanism Vo is linked to the upwards and downwards movement of the movable plate 312b, so in a transient period until the pressure in the hydraulic fluid chamber R2 reaches the set pressure, the supply of hydraulic fluid from the hydraulic fluid chamber R2 of the accumulator A4 to the hydraulic booster H/B is restricted by the valve mechanism Vo. Accordingly, the transmission of pulsations of the hydraulic fluid from the hydraulic fluid chamber R2 of the accumulator A4 to the hydraulic booster H/B is also restricted, and discomfort caused by pulsations of the hydraulic fluid in the hydraulic booster H/B can be decreased.

When the pressure in the hydraulic fluid chamber R2 becomes at least the set pressure, the bellows wall 312a of the bellows 312 in the accumulator A4 expands and contracts, to thereby decrease pulsations of the hydraulic fluid discharged from the hydraulic pump P, so discomfort caused by pulsations of the hydraulic fluid in the hydraulic booster H/B can be decreased. In addition, at this time, as shown in FIG. 9B, the cylindrical valve body 318 of the valve mechanism Vo is pulled out of the upper end of the upper cylindrical portion 315e, and the restriction of the supply of hydraulic fluid from the accumulator A4 to the hydraulic booster H/B is released, so a necessary and sufficient amount of hydraulic fluid can be supplied from the accumulator A4 to the hydraulic booster H/B.

In each of the above-described embodiments, an accumulator A1 A4 has a gas chamber R1 formed on the outside of a bellows and a hydraulic fluid chamber R2 formed on the inside of the bellows. However, as shown by FIGS. 10–12, which illustrate a fifth embodiment, and FIG. 13, which illustrates a sixth embodiment, a hydraulic circuit according to the present invention can have an accumulator A5 or A6 in which a gas chamber R1 is formed on the inside of a bellows 412 or 512, and a hydraulic fluid chamber R2 is formed on the outside of the bellows 412 or 512.

Figure 10:
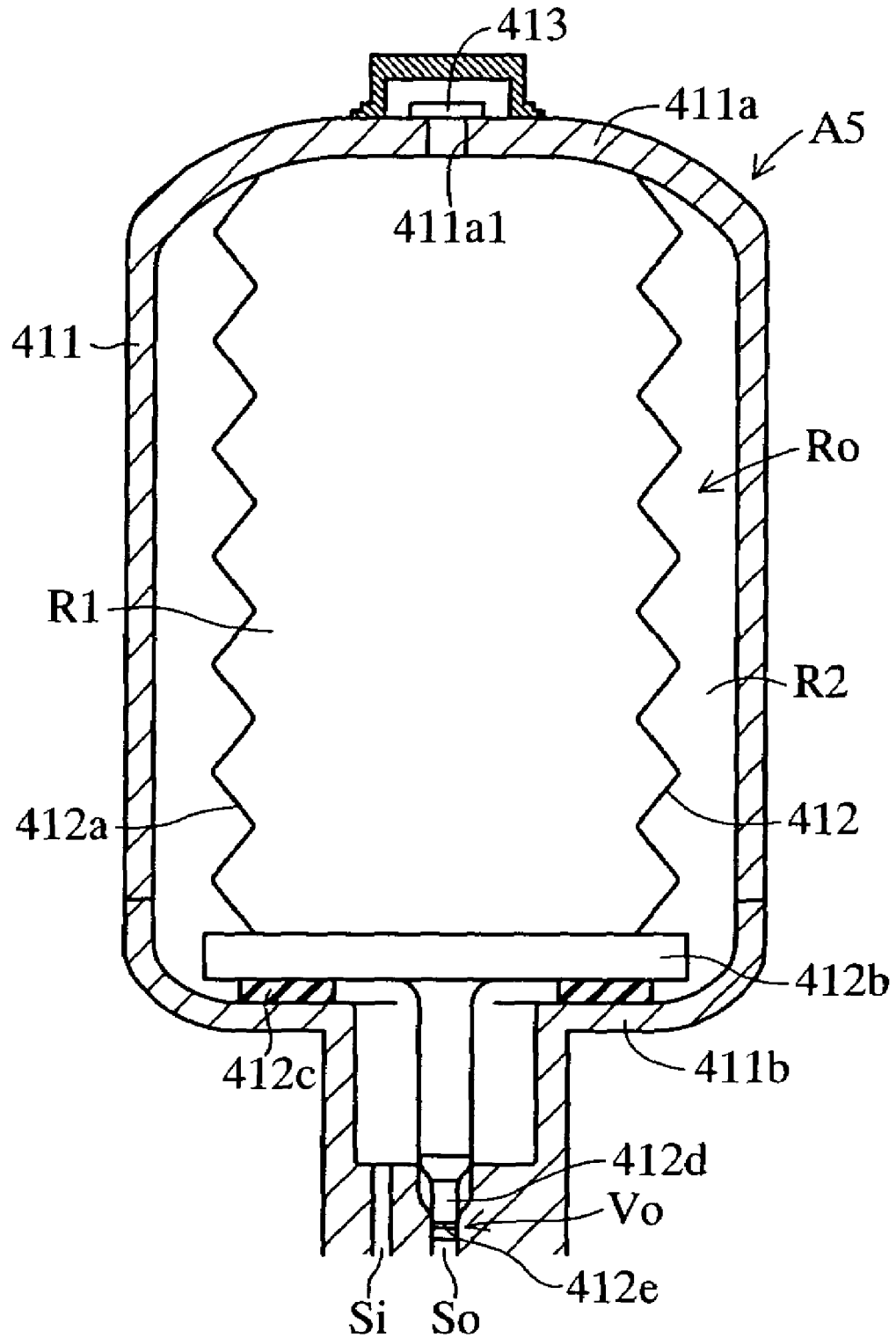
FIG. 10 is a cross-sectional elevation of an accumulator according to a fifth embodiment of the present invention.
Figure 11:
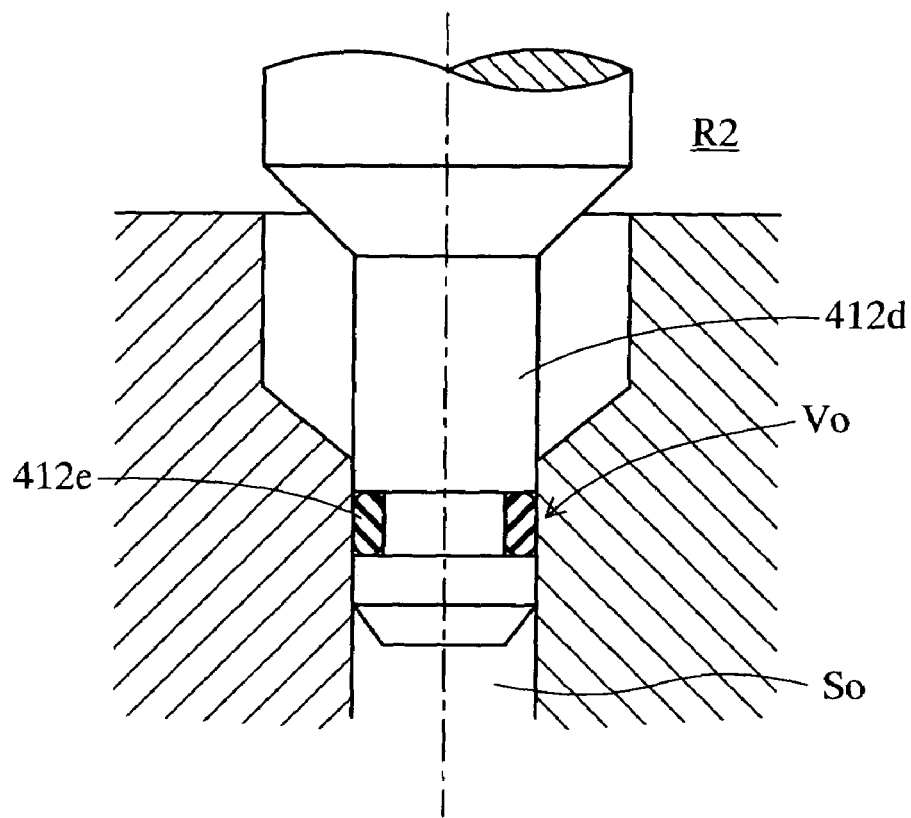
FIG. 11 is an enlarged cross-sectional elevation of the valve mechanism of the accumulator shown in FIG. 10.
Figure 12:
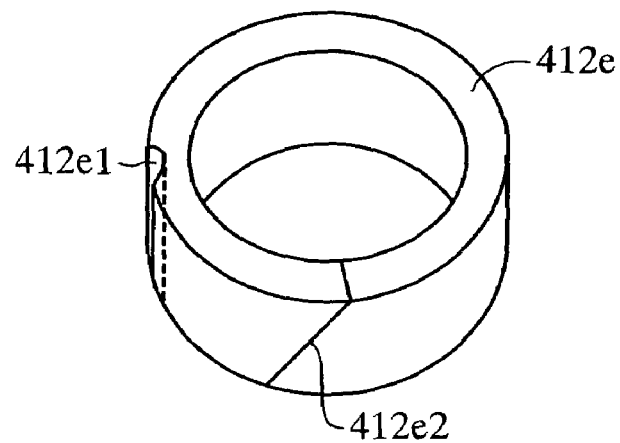
FIG. 12 is an enlarged axonometric view of the sealing ring shown in FIG. 11.

The accumulator A5 of the fifth embodiment shown in FIGS. 10–12 is a metal bellows-type hydraulic accumulator which operates, i.e., the bellows 412 expands and contracts, when the pressure of hydraulic fluid supplied to the interior of the hydraulic fluid chamber R2 is at least a set pressure. The accumulator A5 includes a shell 411 which forms a pressure space Ro, and the bellows 412 which is disposed inside the pressure space Ro. The shell 411 includes upper and lower portions which are connected to each other in a liquid-tight manner. A plug 413 which seals a gas-charging port 411a1 in a gas-tight manner is mounted in an upper wall 411a of the shell 411. An inflow passage Si and a discharge passage So are formed in a lower end portion 411b of the shell 411.

The bellows 412 has a cylindrical metal accordion-shaped bellows wall 412a and a metal movable plate 412b which is connected in a gas-tight and liquid-tight manner to the lower end of the bellows wall 412a. The upper end of the bellows wall 412a is secured in a gas-tight and liquid-tight manner to the upper wall 411a of the shell 411. The bellows 412 divides the pressure space Ro into the gas chamber R1 on the inside of the bellows 412 which is filled with a prescribed pressurized gas, and the hydraulic fluid chamber R2 on the outside of the bellows 412 which communicates with a fluid inlet and a fluid outlet (both omitted from the drawing) through an inflow passage Si and a discharge passage So.

A rod 412d is integrally formed on the lower surface of the movable plate 412b and extends downwards from the lower surface. The rod 412d is positioned so as to be able to fit into and disengage from the upper end of the discharge passage So. The rod 412d, a sealing ring 412e which fits on the outer periphery of the lower end of the rod 412d, and the upper end of the discharge passage So together form a valve mechanism Vo. As shown in FIG. 12, the sealing ring 412e has a narrow air discharge groove 412e1 for discharging air from the hydraulic fluid chamber R2 formed in its outer periphery. The sealing ring 412e is a split ring having a slant slit 412e2 for making it easier to mount and dismount the sealing ring 412e with respect to the rod 412d.

When the movable plate 412b is in the position shown in FIG. 10, the sealing ring 412e fits into and extends into the upper end of the discharge passage So by a prescribed amount, and it restricts the supply of hydraulic fluid to the hydraulic booster H/B to a minute amount. When the movable plate 412b moves upwards from the position shown in FIG. 10 by at least the prescribed amount (namely, when the pressure in the hydraulic fluid chamber R2 becomes at least the set pressure), the sealing ring 412e is pulled out of the upper end of the discharge passage So together with the lower end of the rod 412d, and the restriction of the supply of hydraulic fluid to the hydraulic booster H/B is released.

In the fifth embodiment of FIGS. 10–12, the valve mechanism Vo is linked to the upwards and downwards movements of the movable plate 412b, so in a transient period until the pressure in the hydraulic fluid chamber R2 reaches the set pressure, the supply of hydraulic fluid from the hydraulic fluid chamber R2 of the accumulator A5 to the hydraulic booster H/B is restricted by the valve mechanism Vo. Accordingly, the transmission of pulsations of the hydraulic fluid from the hydraulic fluid chamber R2 of the accumulator A5 to the hydraulic booster H/B is restricted, and discomfort caused by pulsations of the hydraulic fluid in the hydraulic booster H/B can be decreased.

When the pressure in the hydraulic fluid chamber R2 becomes at least the set pressure, the bellows wall 412a of the bellows 412 in the accumulator A5 expands and contracts, to thereby decrease pulsations of the hydraulic fluid discharged from the hydraulic pump P, so discomfort caused by pulsations of the hydraulic fluid in the hydraulic booster H/B can be decreased. Moreover, at this time, the rod 412c and the sealing ring 412e of the valve mechanism Vo are pulled out of the upper end of the discharge passage So and the restriction of the supply of hydraulic fluid from the accumulator A5 to the hydraulic booster H/B is released, so a necessary and sufficient amount of hydraulic fluid can be supplied from the accumulator A5 to the hydraulic booster H/B.

Figure 13:
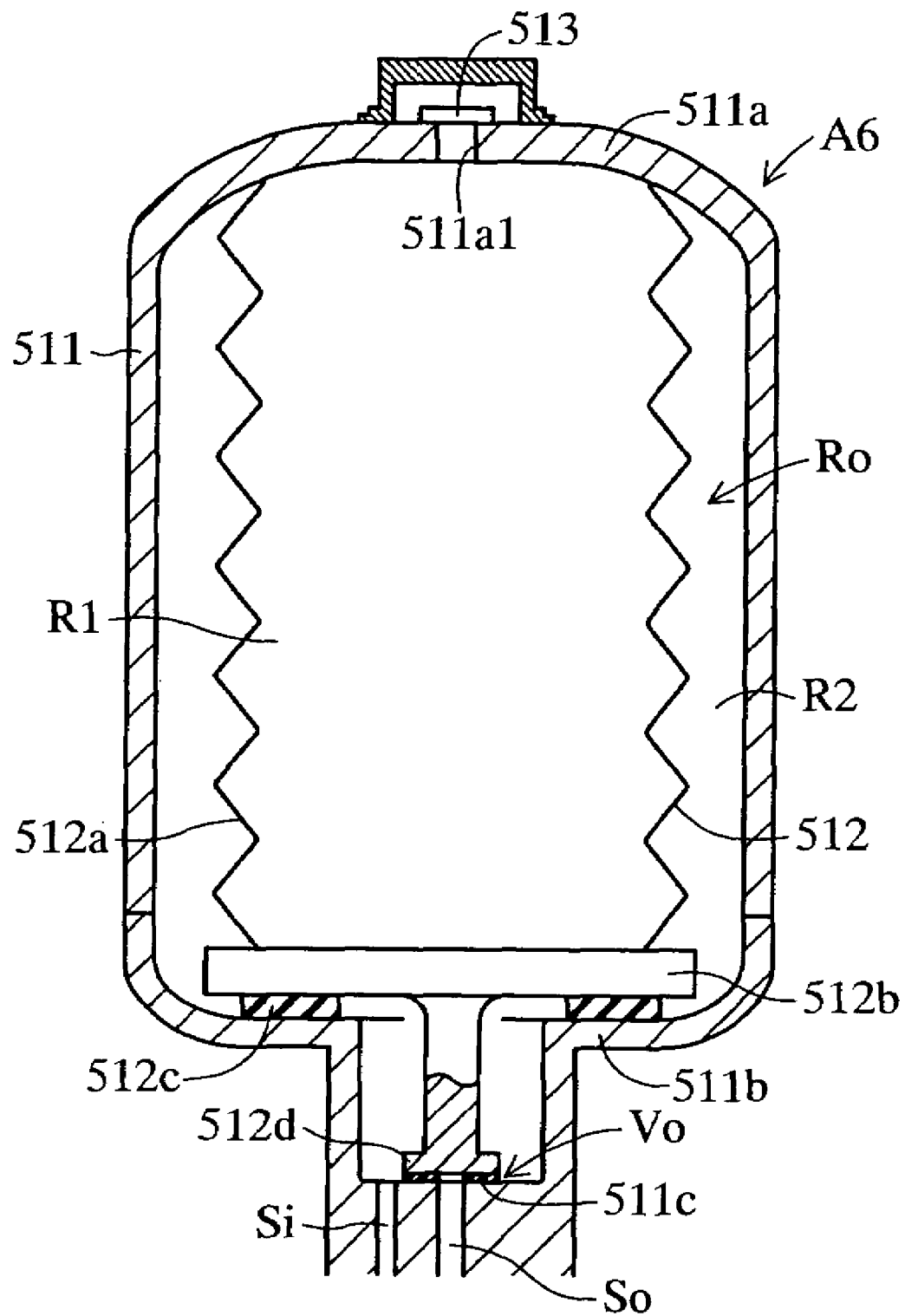
FIG. 13 is a cross-sectional elevation of an accumulator according to a sixth embodiment of the present invention.

In the accumulator A6 of the sixth embodiment shown in FIG. 13, a valve mechanism Vo comprises an annular valve seat 511c which is secured by bonding to the upper end of a discharge passage So, and a valve body 512d. The valve body 512d extends downwards from the lower surface of a movable plate 512b and moves up and down as a single member with the movable plate 512b and can seat and unseat with respect to the valve seat 511c. Except for the structure of the valve mechanism Vo, the structure of this accumulator A6 is essentially the same as that of the accumulator A5 shown in FIG. 10, so a detailed explanation with respect to corresponding parts will be omitted. Reference numbers in FIG. 13 which are the same as or higher by 100 than reference numbers in FIG. 10 indicate corresponding parts, so a detailed explanation of those parts will be omitted.

In this sixth embodiment, the valve mechanism Vo is linked with the upwards and downwards movements of the movable plate 512b, so in a transient period until the pressure in the hydraulic fluid chamber R2 reaches the set pressure, the supply of hydraulic fluid from the hydraulic fluid chamber R2 of the accumulator A6 to the hydraulic booster H/B is restricted (shut off) by the valve mechanism Vo. Accordingly, the transmission of pulsations of the hydraulic fluid from the hydraulic fluid chamber R2 of the accumulator A6 to the hydraulic booster H/B is also restricted, and discomfort caused by pulsations of the hydraulic fluid in the hydraulic booster H/B can be decreased.

When the pressure in the hydraulic fluid chamber R2 becomes at least the set pressure, the bellows wall 512a of the bellows 512 in the accumulator A6 expands and contracts to thereby decrease pulsations of the hydraulic fluid discharged from the hydraulic pump P, so discomfort caused by pulsations of the hydraulic fluid in the hydraulic booster H/B can be decreased. Moreover, at this time, the valve body 512d of the valve mechanism Vo unseats from the valve seat 511c, and the restriction of the supply of hydraulic fluid from the accumulator A6 to the hydraulic booster H/B is released, so a necessary and sufficient amount of hydraulic fluid can be supplied from the accumulator A6 to the hydraulic booster H/B.

Figure 14:
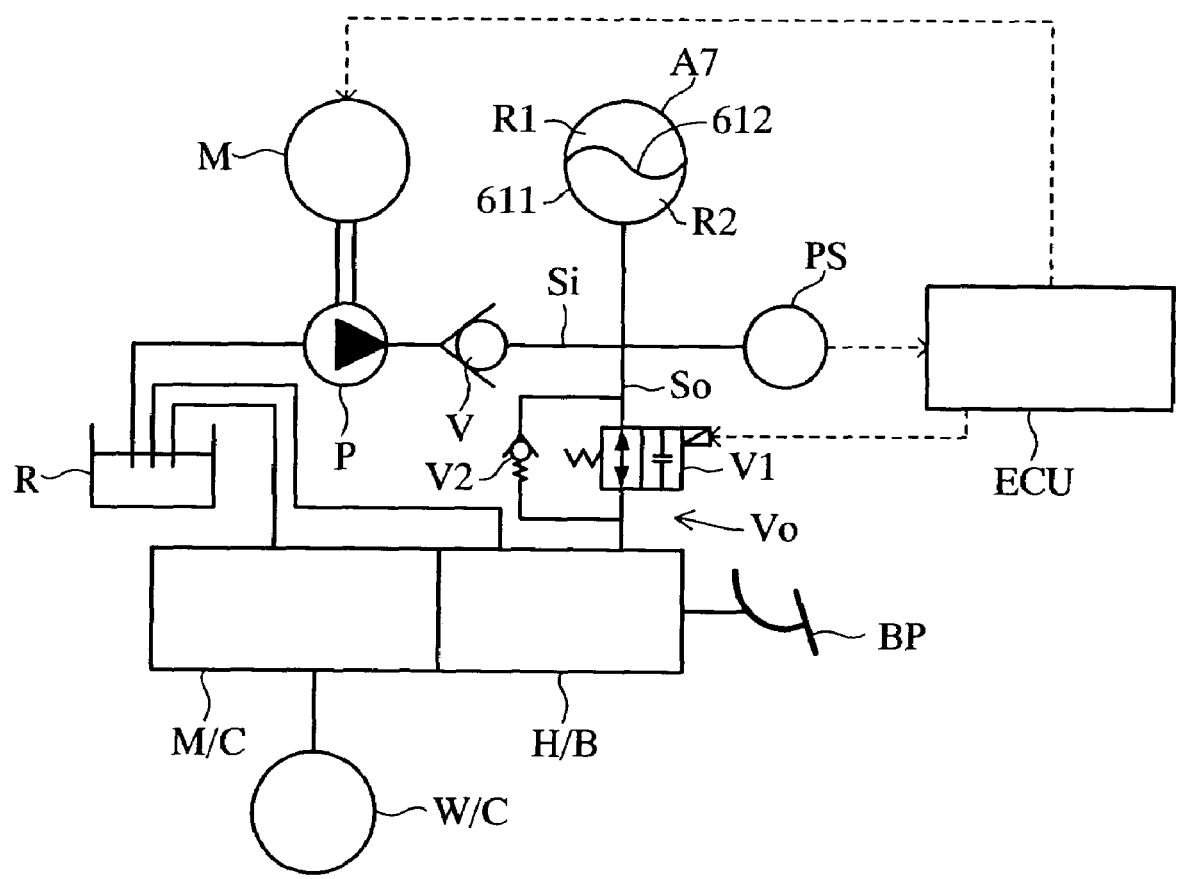
FIG. 14 is a block diagram schematically showing a hydraulic circuit according to a seventh embodiment of the present invention.

In each of the above embodiments, a valve mechanism Vo is provided inside an accumulator A1–A6, so each hydraulic circuit can be constituted in a compact manner. However, as shown in FIG. 14, which illustrates a seventh embodiment, it is possible to provide a valve mechanism Vo in a discharge passage So connecting the hydraulic fluid chamber R2 of an accumulator A7 and a hydraulic booster H/B. In the accumulator A7, the inside of a shell 611 is divided by a bellows 612 into a gas chamber R1 and a hydraulic fluid chamber R2.

A valve mechanism Vo of the seventh embodiment shown in FIG. 14 comprises a solenoid valve V1 which closes the discharge passage So when the pressure in the hydraulic fluid chamber R2 is less than a set pressure and opens the discharge passage So when the pressure in the hydraulic fluid chamber R2 is at least the set pressure, and a relief valve V2 which is connected in parallel with the solenoid valve V1. The hydraulic fluid passes through the relief valve V2 from the accumulator A7 towards the hydraulic booster H/B when the pressure in the hydraulic fluid chamber R2 is at least the set pressure. The open-close operation of the solenoid valve V1 is controlled by an electronic control unit ECU in accordance with a signal from a pressure sensor PS which senses the pressure of hydraulic fluid stored in the accumulator A7 when an ignition switch is in an ON state.

In this seventh embodiment, the valve mechanism Vo is provided in the discharge passage So connecting the hydraulic fluid chamber R2 of the accumulator A7 and the hydraulic booster H/B, so in a transient period until the pressure in the hydraulic fluid chamber R2 reaches the set pressure, the supply of hydraulic fluid from the hydraulic fluid chamber R2 of the accumulator A7 to the hydraulic booster H/B is restricted by the valve mechanism Vo. Accordingly, the transmission of pulsations of the hydraulic fluid from the hydraulic fluid chamber R2 of the accumulator A7 to the hydraulic booster H/B is also restricted, and discomfort caused by pulsations of the hydraulic fluid in the hydraulic booster H/B can be decreased.

When the pressure in the hydraulic fluid chamber R2 becomes at least the set pressure, the bellows 612 of the accumulator A7 expands and contracts, to thereby decrease pulsations of the hydraulic fluid discharged from the hydraulic pump P, so discomfort caused by pulsations of the hydraulic fluid in the hydraulic booster H/B can be decreased. Moreover, at this time, the valve mechanism Vo releases the restriction of the supply of hydraulic fluid from the accumulator A7 to the hydraulic booster H/B, so a necessary and sufficient amount of hydraulic fluid can be supplied from the accumulator A7 to the hydraulic booster H/B.

In this seventh embodiment, the relief valve V2 which passes the hydraulic fluid from the accumulator A7 towards the hydraulic booster H/B when the pressure in the hydraulic fluid chamber R2 is at least the set pressure is connected in parallel with the solenoid valve V1, so if the pressure in the hydraulic fluid chamber R2 is at least the set pressure, even if the solenoid valve V1 does not open the discharge passage So, the hydraulic fluid can be passed from the accumulator A7 towards the hydraulic booster H/B through the relief valve V2.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic circuit comprising:
a hydraulic pump;
a hydraulic actuator;
an accumulator fluidly connected between the hydraulic pump and the hydraulic actuator, the accumulator including an inflow passage through which hydraulic fluid from the hydraulic pump is introduced into a hydraulic fluid chamber of the accumulator, and a discharge passage from which the hydraulic fluid from the hydraulic fluid chamber is discharged to the hydraulic actuator, the accumulator not operating when the pressure in the hydraulic fluid chamber is less than a set pressure and operating when the pressure in the hydraulic fluid chamber is at least the set pressure; and
a valve mechanism which restricts the discharge of the hydraulic fluid from the hydraulic fluid chamber to the hydraulic actuator in a state in which the accumulator does not operate and which releases the restriction on the discharge of hydraulic fluid to the hydraulic actuator in a state in which the accumulator operates, wherein the valve mechanism has an air discharge passage which only discharges air from the hydraulic fluid chamber to the hydraulic actuator in the state in which the accumulator does not operate whereas the air discharge passage is not used for discharging when the accumulator operates.

2. A hydraulic circuit according to claim 1, wherein the valve mechanism is installed inside the accumulator.

3. A hydraulic circuit according to claim 2, wherein the valve mechanism comprises:
a pipe which is coaxially disposed in the inflow passage and forming the discharge passage at its center; and
a valve spool which is provided on a movable plate of the bellows and positioned so as to be able to fit into and disengage from the pipe and which valve spool has an air discharge hole as the air discharge passage.

4. A hydraulic circuit according to claim 2, wherein the accumulator operates by expansion and contraction of a bellows which divides a pressure space into a gas chamber and the hydraulic fluid chamber, the accumulator having a piston which moves with the bellows, and the valve mechanism comprising:
a pipe which is coaxially disposed in the inflow passage and forming the discharge passage at its center; and
a valve spool which is provided on the piston and positioned so as to be able to fit into and disengage from the pipe and which valve spool has an air discharge hole as the air discharge passage.

* * * * *